US010315784B2

(12) United States Patent
Leonard

(10) Patent No.: US 10,315,784 B2
(45) Date of Patent: Jun. 11, 2019

(54) SYSTEM FOR INCREASING STORAGE VOLUME OF A CUBESAT

(71) Applicant: Matthew J Leonard, College Station, TX (US)

(72) Inventor: Matthew J Leonard, College Station, TX (US)

( * ) Notice: Subject to any disclaimer, the term of this patent is extended or adjusted under 35 U.S.C. 154(b) by 368 days.

(21) Appl. No.: 15/363,642

(22) Filed: Nov. 29, 2016

(65) Prior Publication Data

US 2018/0141684 A1    May 24, 2018

Related U.S. Application Data

(63) Continuation-in-part of application No. 15/360,797, filed on Nov. 23, 2016.

(51) Int. Cl.
*B64G 1/66* (2006.01)
*B64G 1/10* (2006.01)

(52) U.S. Cl.
CPC .............. *B64G 1/66* (2013.01); *B64G 1/105* (2013.01); *B64G 2001/1092* (2013.01)

(58) Field of Classification Search
CPC .... B64G 1/66; B64G 2001/1092; B64G 1/10; B64G 1/402; B64G 1/002; B64G 1/105; B64G 1/1007; B64G 2700/66
See application file for complete search history.

(56) References Cited

U.S. PATENT DOCUMENTS

| 2014/0263844 A1* | 9/2014 | Cook, Jr. | B64G 1/222 244/164 |
| 2015/0102172 A1* | 4/2015 | Thurn | B64G 1/40 244/158.2 |
| 2016/0122041 A1* | 5/2016 | Abrams | B64G 1/222 244/172.6 |

* cited by examiner

*Primary Examiner* — Assres H Woldemaryam

(57) ABSTRACT

A CubeSat side panel with an additional storage compartment includes a satellite endcap, a hinge assembly, and at least one CubeSat component. A plurality of lateral lips and a top extremity of the satellite endcap delineate a storage compartment within the satellite endcap. The storage compartment allows the Cubesat component to be mounted upon an inner surface of the satellite endcap. The hinge assembly connects the satellite endcap to a frame of the CubeSat thus allowing the CubeSat side panel to open upward and away from the CubeSat. Resultantly, the hinge assembly provides easy access to the Cubesat component of the satellite endcap and other existing components that are positioned within the frame of the CubeSat.

12 Claims, 6 Drawing Sheets

SYSTEM FOR INCREASING STORAGE VOLUME OF A CUBESAT

FIELD OF THE INVENTION

The present invention relates generally to a CubeSat. More specifically, the present invention is a CubeSat side panel that aligns with a planer surface of the CubeSat to increase the limited storage volume of the CubeSat.

BACKGROUND OF THE INVENTION

A CubeSat is a type of miniaturized satellite that is utilized for space research and often put in orbit by deployers on the international space station or launched as secondary payload on a launch vehicle. Generally, the CubeSat is made of multiples of 10×10×11.35 centimeter cubic units and have a mass of no more than 1.33 kilograms per unit. Due to the compact size and the deploying cost, the CubeSat generally requires to meet the aforementioned dimensions. Resultantly, the storage volume of the CubeSat also becomes limited due to the aforementioned dimensions and the specifications of launching rails.

It is therefore an objective of the present invention to provides a CubeSat side panel that is configured to form an additional storage compartment. More specifically, the CubeSat side panel is completed with a satellite endcap and a hinge assembly so that the satellite endcap can be laterally secured to a frame of the CubeSat through the hinge assembly. The perimeter of the satellite endcap delineates a storage compartment such that the storage compartment faces toward the frame of the CubeSat. As a result, the storage compartment increases the limited storage volume of the CubeSat so that one or more CubeSat component can be mounted to the satellite endcap.

DETAIL DESCRIPTIONS OF THE INVENTION

All illustrations of the drawings are for the purpose of describing selected versions of the present invention and are not intended to limit the scope of the present invention.

Figure 1:
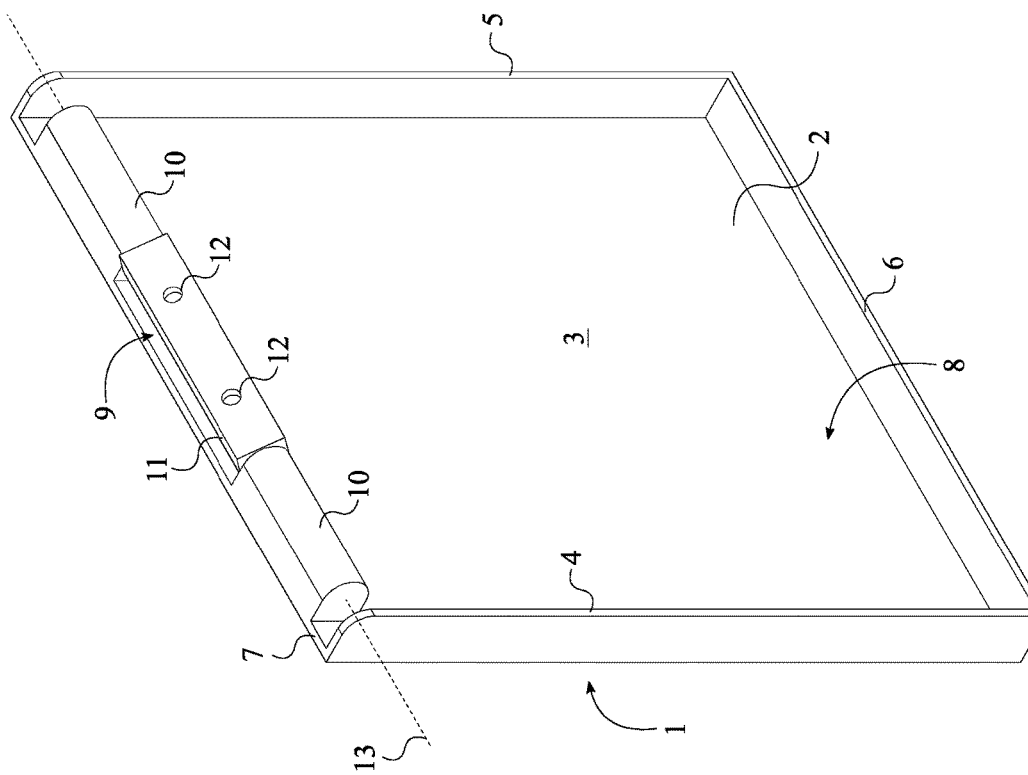
FIG. 1 is a perspective view of the present invention showing the storage compartment.

The present invention is a system for increasing storage volume of a CubeSat 15. More specifically, the present invention is a CubeSat side panel with additional storage compartment 8 that creates further storage volume in relation to the CubeSat 15. Since the storage space within the CubeSat 15 is limited, the further storage volume created by the present invention is utilized to mount or place different components (e.g. electronic devices) that are related to the CubeSat 15 functionality and research programs. Generally, the CubeSat 15 comprises a frame 16, a plurality of components, and six CubeSat side panels. The frame 16 provides the structural support for the CubeSat 15 and is utilized to mount the plurality of components within. The CubeSat side panel is a flat surface and encloses the frame 16 and the plurality of components from all six sides of the frame 16. The present invention is able to improve upon the CubeSat side panel so that the innovated CubeSat 15 is able to create further storage volume through the CubeSat side panel. In reference to FIG. 1 and FIG. 3, the present invention comprises a satellite endcap 1, a hinge assembly 9, and at least one CubeSat component 14. The structural configuration of the satellite endcap 1 and the hinge assembly 9 delineate a storage compartment 8 of the present invention thus allowing the CubeSat component 14 to be selectively positioned and mounted to the satellite endcap 1.

Figure 2:
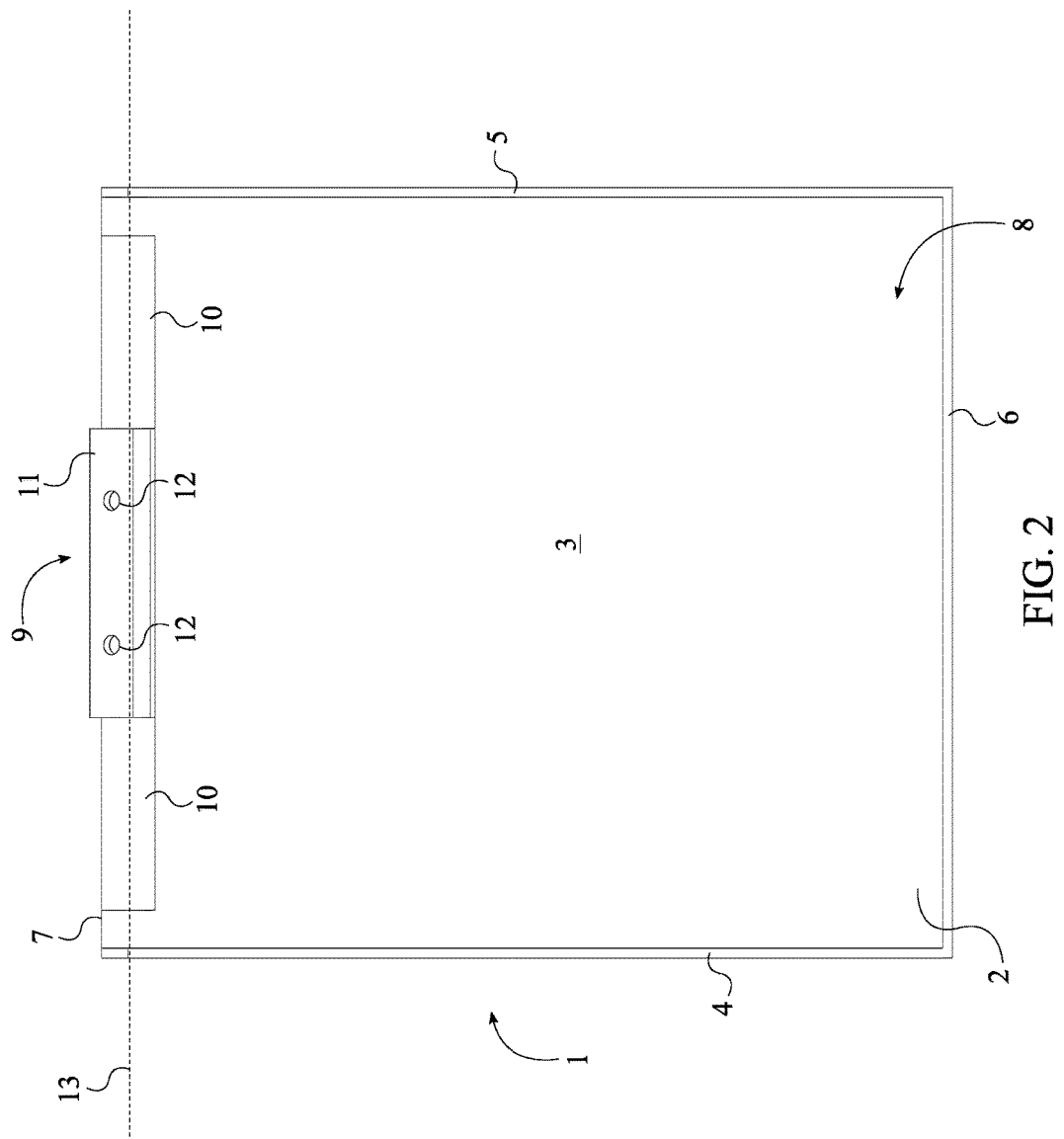
FIG. 2 is a back view of the present invention showing the storage compartment.

The satellite endcap 1 is configured to laterally connect with the frame 16. Preferably, the CubeSat 15 comprises a pair of satellite endcaps 1 as each satellite endcap 1 is oppositely positioned of each other across the frame 16. However, the CubeSat 15 is not limited to the pair of satellite endcaps 1 and can comprise two or three pairs of satellite endcaps 1 so that each planer surface 17 of the CubeSat 15 can be enclosed with the satellite endcap 1. In reference to FIG. 1-2, the satellite endcap 1 comprises a base panel 2, a first lateral lip 4, a second lateral lip 5, a bottom lip 6, and a top extremity 7. The base panel 2 is configured to a flat surface member and comprises an inner surface 3 and an outer surface. The inner surface 3 faces toward the frame 16 and the outer surface faces away from the frame 16. The first lateral lip 4, the second lateral lip 5, the bottom lateral lip, and the top extremity 7 are perimetrically positioned around the base panel 2 in such a way that the first lateral lip 4, the second lateral lip 5, and the bottom lateral lip extend in the same direction. More specifically, the bottom lip 6 is oppositely positioned of the top extremity 7 and positioned across the base panel 2. The bottom lip 6 is perpendicularly and terminally connected with the base panel 2 thus creating a right angular connection between the bottom lip 6 and the inner surface 3. The first lateral lip 4 is oppositely positioned of the second lateral lip 5 and positioned across the base panel 2 thus the first lateral lip 4 and the second lateral lip 5 are perpendicularly positioned with the bottom lip 6. In reference to FIG. 1-2, the first lateral lip 4 is perpendicularly and terminally connected with the base panel 2 thus creating a right angular connection between the first lateral lip 4 and the inner surface 3. Similarly, the second lateral lip 5 is perpendicularly and terminally connected with the base panel 2 thus creating a right angular connection between the second lateral lip 5 and the inner surface 3. As a result of the positioning of the first lateral lip 4, the second lateral lip 5, the bottom lateral lip, the top extremity 7, and the inner surface 3, the present invention is able to delineate the storage compartment 8.

Figure 6:
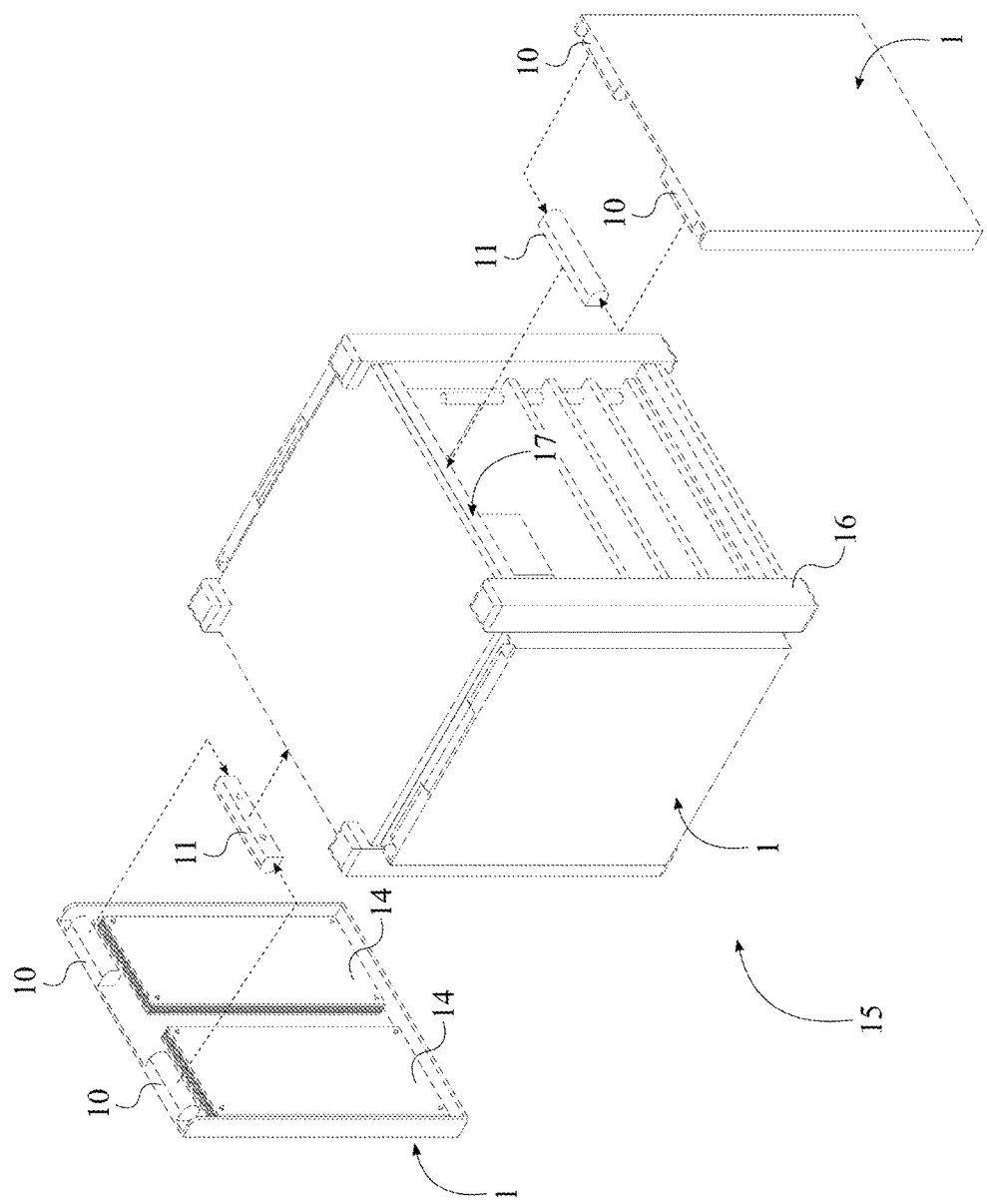
FIG. 6 is an exploded view of the Cubesat and the present invention showing the connections points of the hinge assembly.

The hinge assembly 9 secures the satellite endcap 1 to the frame 16 and comprises at least one rotor member 10, at least one stator member 11, a frame attachment feature 12, and a central rotational axis 13. In reference to FIG. 1 and FIG. 6, the rotor member 10 is adjacently positioned with the top extremity 7 and connected with the inner surface 3. The rotor member 10 is rotatably mounted or mechanically coupled with the stator member 11 along the central rotational axis 13. The frame attachment feature 12 is integrated into the stator member 11 as the stator member 11 is utilized to secure the present invention to the frame 16 through the frame attachment feature 12. More specifically, the satellite endcap 1 is concentrically positioned with one of the planer surface 17 of the CubeSat 15 so that the frame attachment feature 12 is able to mount the satellite endcap 1 to the frame 16. Resultantly, the satellite endcap 1 is able to rotate between an opened positioned and a closed positioned about the central rotational axis 13 through the hinge assembly 9. More specifically, the closed position protects the CubeSat component 14 from external and environmental element in order to improve the reliability of the CubeSat component 14. The opened position enables the user to access the inner surface 3 so that the CubeSat component 14 can be easily mounted or repaired when necessary.

Figure 3:
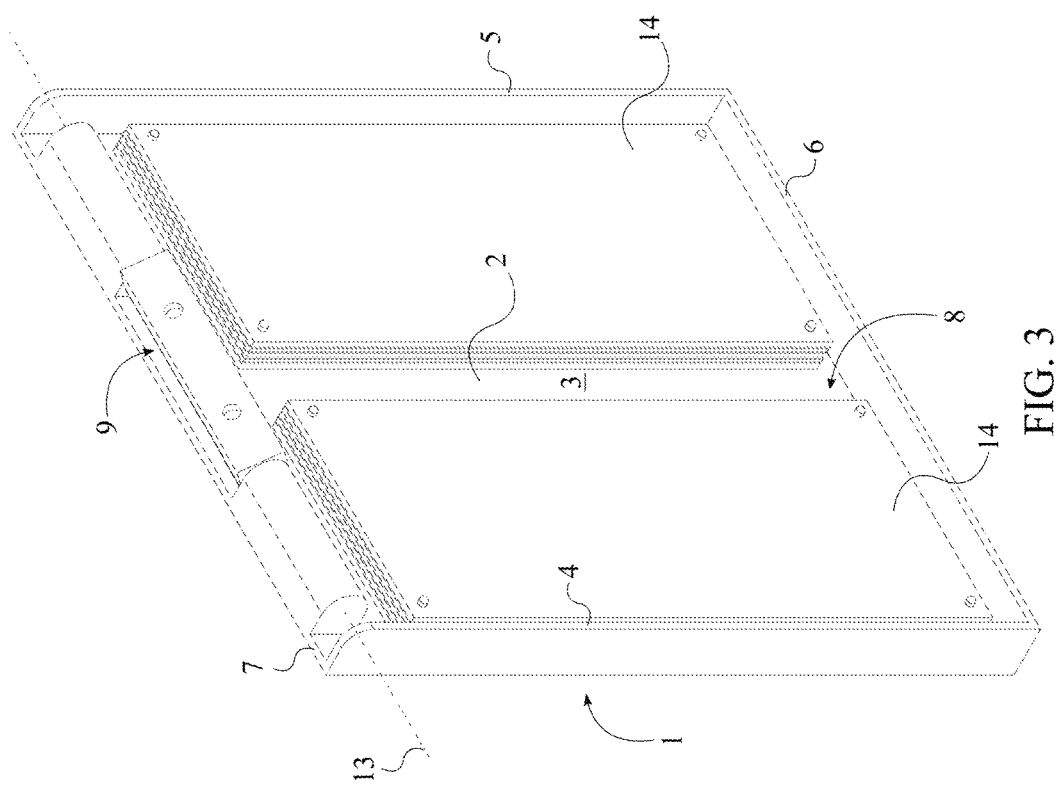
FIG. 3 is a perspective view of the present invention showing the Cubesat components within the storage compartment.
Figure 4:
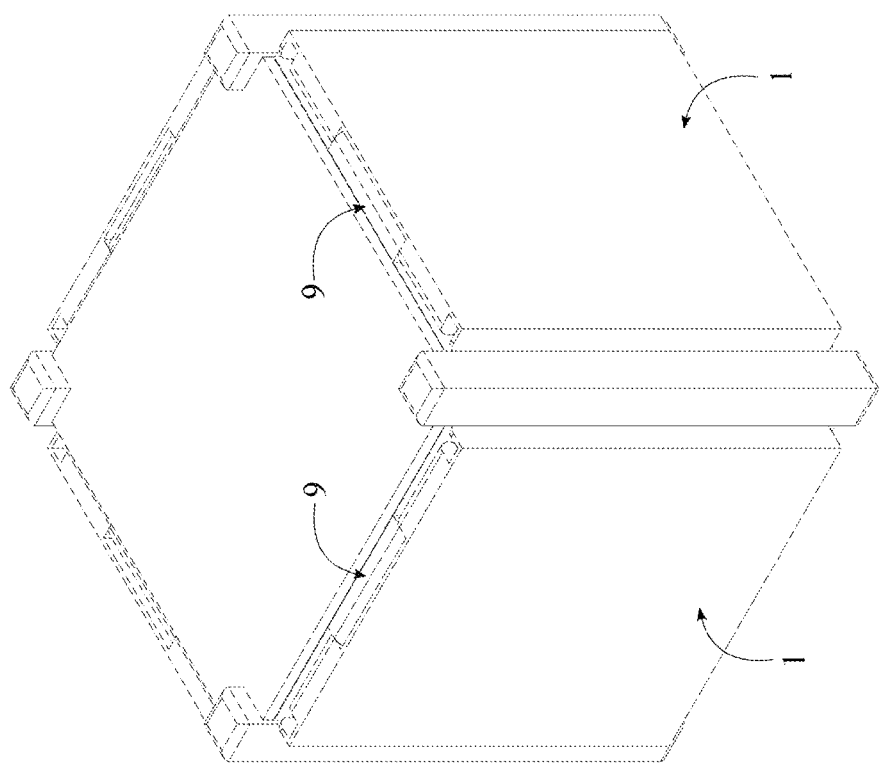
FIG. 4 is a top perspective view of the CubeSat with the present invention, wherein the present invention is at the closed position.
Figure 5:
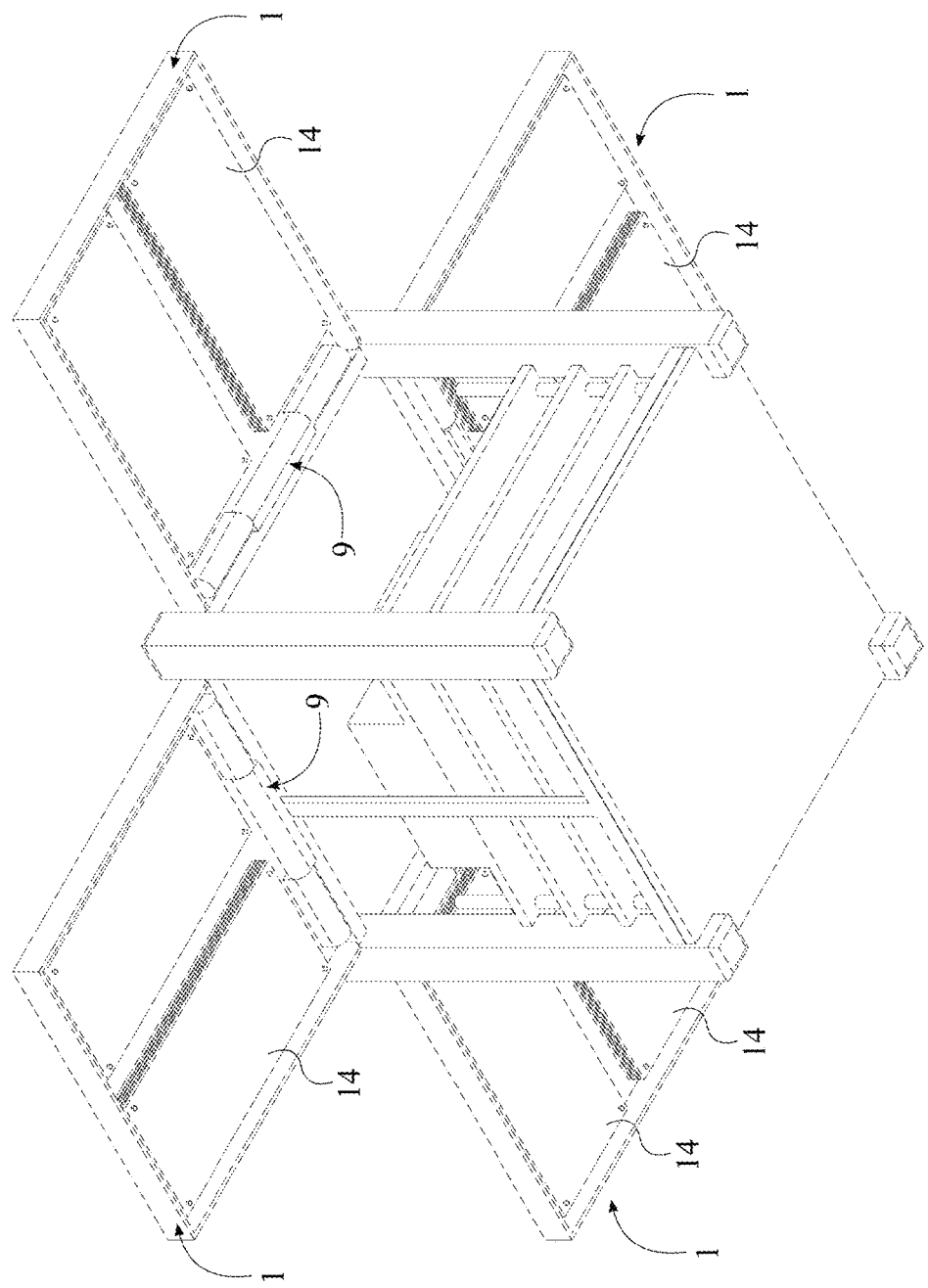
FIG. 5 is a bottom perspective view of the CubeSat with the present invention, wherein the present invention is at the opened position.

In reference to FIG. 3 and FIG. 5, the CubeSat component 14 is selectively positioned within the first lateral lip 4, the second lateral lip 5, the bottom lip 6, and the top extremity 7. The CubeSat component 14 is adjacently mounted upon the inner surface 3 by a plurality of fasteners. The CubeSat component 14 is preferably flattened circuit boards within the present invention. However, the CubeSat component 14 is not limited to the flattened circuit boards and can be any other items or modules of the CubeSat 15. Industry standard nut-and-bolt fasteners are preferably utilized as the plurality of fasteners within the present invention; however, the plurality of fasteners can include, but is not limited to, screws, adhesive strips, magnetic fasteners, and any other type of male and female fasteners.

In reference to the preferred embodiment of the present invention, the at least one rotor member 10 comprises a first fixed member and a second fixed member. More specifically, the first fixed member is adjacently positioned with the first lateral lip 4. The second fixed member is adjacently positioned with the second lateral lip 5. As a result, both the first fixed member and the second fixed member are independently connected along inner surface 3. In order for the proper functionality of the stator member 11 within the present invention, the stator member 11 comprises a bottom surface, a first width surface, a second width surface, a first elongated surface, a second elongated surface, and a curved surface. All the surfaces of the stator member 11 delineate the shape of the stator member 11 so that the hinge assembly 9 can efficiently function within the preferred embodiment. More specifically, the first width surface, the second width surface, the first elongated surface, and the second elongated surface are perimetrically and perpendicularly positioned with the bottom surface. The first width surface and the second width surface are oppositely positioned of each other across the bottom surface that is formed into a rectangular shaped. The first elongated surface is perpendicularly positioned with the first width surface and the second width surface. The second elongated surface is perpendicularly positioned with the first width surface and the second width surface. As a result, the first elongated surface and the second elongated surface are oppositely positioned of each other along the bottom surface. The curved surface is oppositely positioned of the bottom surface and perimetrically connected with the first width surface, the second width surface, the first elongated surface, and the second elongated surface.

In reference to FIG. 3-6, the hinge assembly 9 within the preferred embodiment of the present invention, the first width surface is adjacently positioned with the first fixed member and the second width surface is adjacently positioned with the second fixed member. The first fixed member and the second fixed member are then rotatably connected with the stator member 11 along the central rotational axis 13. The bottom surface is secured to the frame 16 through the frame attachment feature 12 such that the satellite endcap 1 opens upward, allowing easy access to the inner surface 3 and the plurality of components and the CubeSat component 14. Additionally, the curved surface is adjacently positioned with the inner surface 3 so that the satellite endcap 1 can smoothly rotate in between the opened positioned and the closed positioned without contacting the stator member 11. Furthermore, the first elongated surface is adjacently positioned with the top extremity 7 and meets the inner surface 3 when the satellite endcap 1 is at the opened positioned, stopping the upward movement of the satellite endcap 1.

Although the invention has been explained in relation to its preferred embodiment, it is to be understood that many other possible modifications and variations can be made without departing from the spirit and scope of the invention as hereinafter claimed.

What is claimed is:

1. A CubeSat volume increasing system comprises:
   a satellite endcap;
   a hinge assembly;
   the satellite endcap comprises a base panel, a first lateral lip, a second lateral lip, a bottom lip, and a top extremity;
   the hinge assembly comprises at least one rotor member, at least one stator member, and a frame attachment feature;
   the first lateral lip, the second lateral lip, the bottom lip, and the top extremity being perimetrically positioned around the base panel;
   the rotor member being adjacently positioned with the top extremity;
   the rotor member being connected with an inner surface of the base panel;
   the rotor member being rotatably mounted with the stator member; and
   the frame attachment feature being integrated into the stator member.

2. The CubeSat volume increasing system as claimed in claim 1 comprises:
   the bottom lip being oppositely positioned of the top extremity, across the base panel;
   the bottom lip being perpendicularly and terminally connected with the base panel;
   the first lateral lip being oppositely positioned of the second lateral lip, across the base panel;
   the first lateral lip and the second lateral lip being perpendicularly positioned with the bottom lip; and
   the first lateral lip and the second lateral lip being terminally connected with the base panel.

3. The CubeSat volume increasing system as claimed in claim 1, wherein the first lateral lip, the second lateral lip, the bottom lip, the top extremity, and the inner surface of the base panel delineate a storage compartment.

4. The CubeSat volume increasing system as claimed in claim 1 comprises:
   a CubeSat;
   the satellite endcap being concentrically positioned with a planer surface of the CubeSat;
   the frame attachment feature being mounted to a frame of the CubeSat; and
   the rotor member being rotatably connected with the stator member along a central rotational axis.

5. The CubeSat volume increasing system as claimed in claim 4 comprises:
   at least one CubeSat component;

the CubeSat component being selectively positioned within the first lateral lip, the second lateral lip, the bottom lip, and the top extremity; and the CubeSat component being adjacently mounted upon the inner surface of the base panel.

6. A CubeSat volume increasing system comprises:

a satellite endcap;

a hinge assembly;

the satellite endcap comprises a base panel, a first lateral lip, a second lateral lip, a bottom lip, and a top extremity;

the hinge assembly comprises at least one rotor member, at least one stator member, and a frame attachment feature;

the first lateral lip, the second lateral lip, the bottom lip, and the top extremity being perimetrically positioned around the base panel;

the rotor member being adjacently positioned with the top extremity;

the rotor member being connected with an inner surface of the base panel;

the rotor member being rotatably mounted with the stator member;

the frame attachment feature being integrated into the stator member; and a storage compartment being delineated with the first lateral lip, the second lateral lip, the bottom lip, the top extremity, and the inner surface.

7. The CubeSat volume increasing system as claimed in claim 6 comprises:

the bottom lip being oppositely positioned of the top extremity, across the base panel;

the bottom lip being perpendicularly and terminally connected with the base panel;

the first lateral lip being oppositely positioned of the second lateral lip, across the base panel;

the first lateral lip and the second lateral lip being perpendicularly positioned with the bottom lip; and the first lateral lip and the second lateral lip being terminally connected with the base panel.

8. The CubeSat volume increasing system as claimed in claim 6 comprises:

a CubeSat;

the satellite endcap being concentrically positioned with a planer surface of the CubeSat;

the frame attachment feature being mounted to a frame of the CubeSat; and the rotor member being rotatably connected with the stator member along a central rotational axis.

9. The CubeSat volume increasing system as claimed in claim 8 comprises:

at least one CubeSat component;

the CubeSat component being selectively positioned within the first lateral lip, the second lateral lip, the bottom lip, and the top extremity; and the CubeSat component being adjacently mounted upon the inner surface of the base panel.

10. A CubeSat volume increasing system comprises:

a satellite endcap;

a hinge assembly;

the satellite endcap comprises a base panel, a first lateral lip, a second lateral lip, a bottom lip, and a top extremity;

the hinge assembly comprises at least one rotor member, at least one stator member, and a frame attachment feature;

the first lateral lip, the second lateral lip, the bottom lip, and the top extremity being perimetrically positioned around the base panel;

the rotor member being adjacently positioned with the top extremity;

the rotor member being connected with an inner surface of the base panel;

the rotor member being rotatably mounted with the stator member;

the frame attachment feature being integrated into the stator member;

a storage compartment being delineated with the first lateral lip, the second lateral lip, the bottom lip, the top extremity, and the inner surface;

a CubeSat;

the satellite endcap being concentrically positioned with a planer surface of the CubeSat;

the frame attachment feature being mounted to a frame of the CubeSat; and the rotor member being rotatably connected with the stator member along a central rotational axis.

11. The CubeSat volume increasing system as claimed in claim 10 comprises:

the bottom lip being oppositely positioned of the top extremity, across the base panel;

the bottom lip being perpendicularly and terminally connected with the base panel;

the first lateral lip being oppositely positioned of the second lateral lip, across the base panel;

the first lateral lip and the second lateral lip being perpendicularly positioned with the bottom lip; and the first lateral lip and the second lateral lip being terminally connected with the base panel.

12. The CubeSat volume increasing system as claimed in claim 10 comprises:

at least one CubeSat component;

the CubeSat component being selectively positioned within the first lateral lip, the second lateral lip, the bottom lip, and the top extremity; and the CubeSat component being adjacently mounted upon the inner surface of the base panel.

* * * * *